March 14, 1950     M. GRAVES     2,500,540
TAPPING MACHINE

Filed Jan. 11, 1945     4 Sheets-Sheet 2

INVENTOR.
MARK GRAVES
BY
Oberlin + Limbach
ATTORNEYS

March 14, 1950     M. GRAVES     2,500,540

TAPPING MACHINE

Filed Jan. 11, 1945     4 Sheets-Sheet 3

INVENTOR.
MARK GRAVES
BY
Oberlin & Limbach
ATTORNEYS

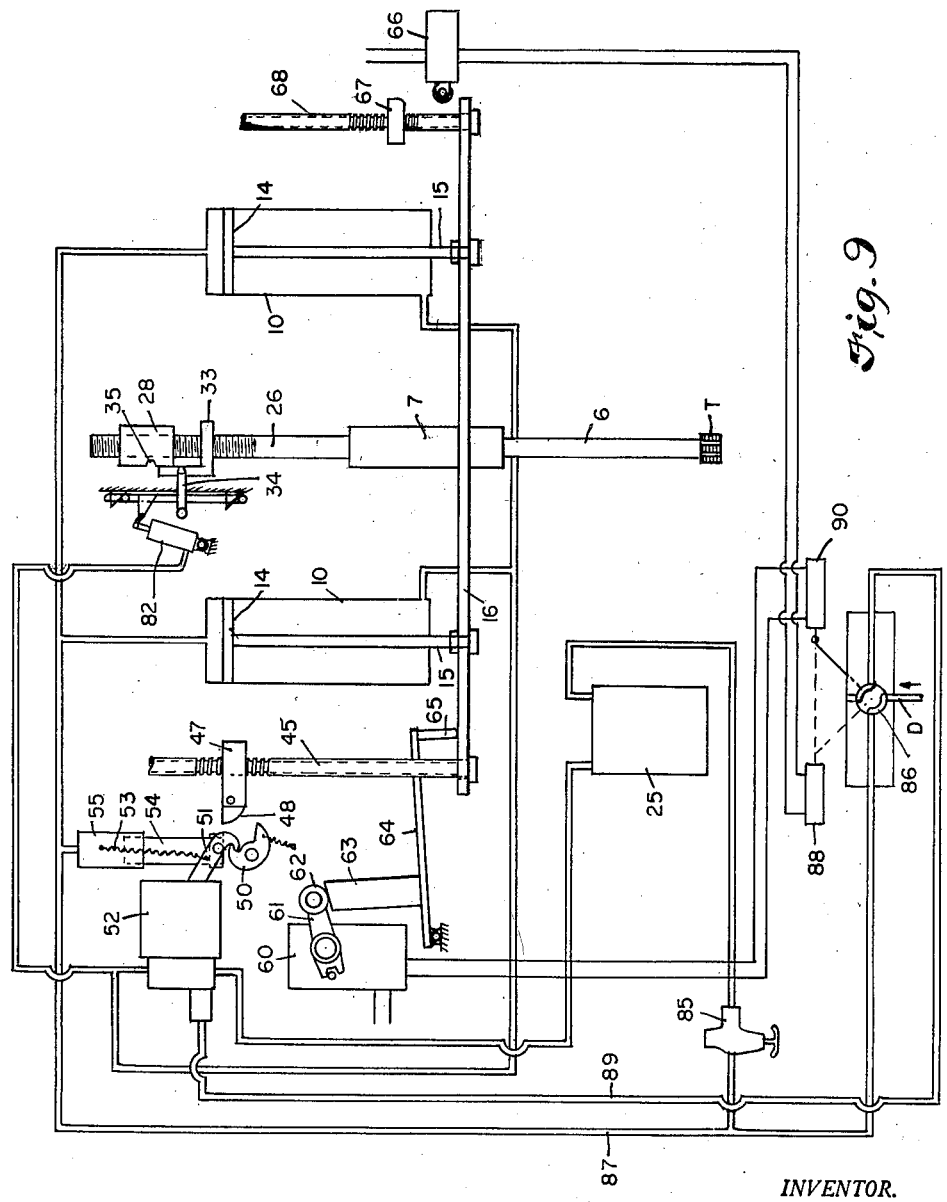

Patented Mar. 14, 1950

2,500,540

UNITED STATES PATENT OFFICE 2,500,540

TAPPING MACHINE

Mark Graves, Cleveland Heights, Ohio, assignor to The Cleveland Tapping Machine Company, Cleveland, Ohio, a corporation of Ohio Application January 11, 1945, Serial No. 572,349

6 Claims. (Cl. 10—129)

The present improvements relate as indicated to tapping machines or machines for performing like thread cutting or analogous operations in which a rotatable tool requires to be moved toward and from the work-piece and be reversibly driven so as successively to engage with and be disengaged from such work-piece. Thus in tapping internal or external threads the spindle which carries the thread cutting tool in addition to a reciprocable movement to bring the tool toward and from the work-piece requires to be rotated first in a clockwise or counterclockwise direction, depending upon the thread to be cut, and then in a reverse direction.

One simple form of manually controlled tapping machine will be found illustrated in my Patent No. 2,294,231, dated August 25, 1942, which covers an improved form of drive means for the tool carrying spindle. The present improvements have as one object the provision of means for automatically controlling the several operations involved so that once the machine is set up for production all the operator needs to do is to feed in the work and remove it after the tapping cycles. Another object is to provide means whereby the depth to which the thread is carried in the work is always under control. Another object is to provide means for the rapid approach and retraction of the spindle and for varying the speed of rotation of the latter so that the tool may be disengaged from the work by rotating the same more rapidly than during the thread cutting operation. Also means are provided so that the spindle is rotated only when it is thus engaged with the work either in cutting a thread or in being disengaged therefrom.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 9 is a diagrammatic view of the machine showing the interrelation of the various operative parts and the means provided for control of the same.

Figure 1:
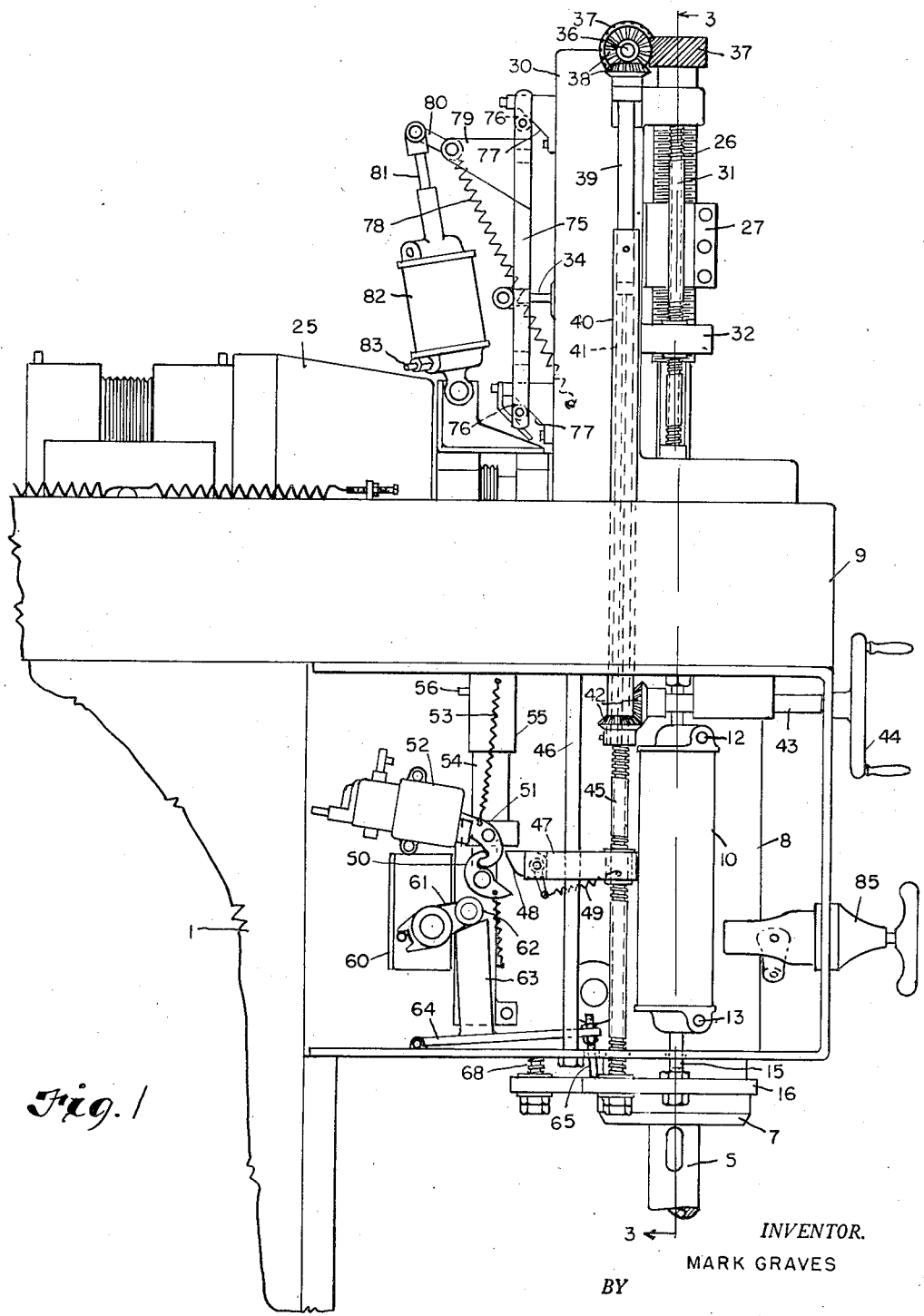
Fig. 1 is a side elevational view of the essential parts of a tapping machine embodying my present improvements.
Figure 2:
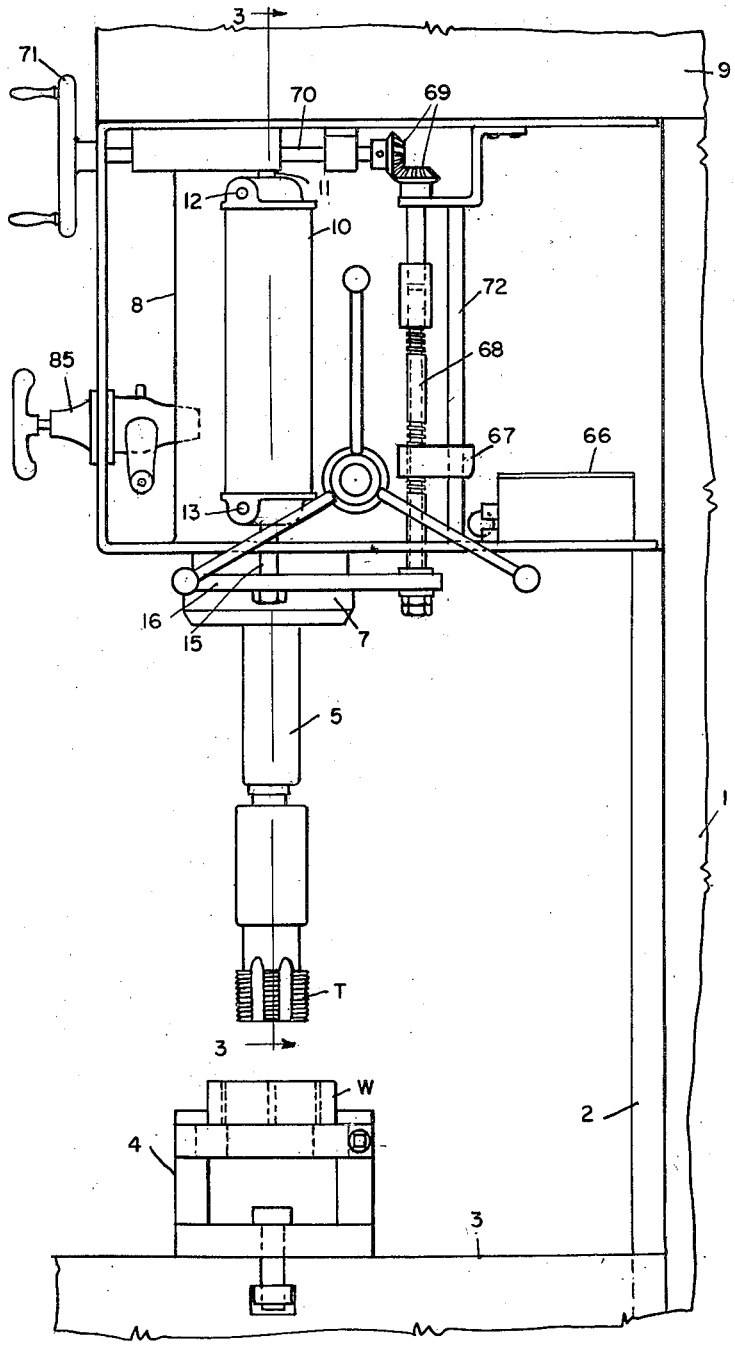
Fig. 2 is likewise a side elevation of a portion of such machine as viewed in a direction opposite to that of Fig. 1.

Referring to Figs. 1 and 2, the main frame 1 of the machine is illustrated only in part. This frame, in the case of the particular tapping machine selected for the purpose of illustration, will consist of a vertical column rising from a suitable base (not shown). Vertically adjustable in the usual manner on a guide 2 provided on the front face of such frame is a work table 3 provided with any suitable form of clamping means 4 whereby the work-piece W may be secured in proper position for the operation to be performed thereon. As illustrated, such work-piece is assumed to be one requiring an internal thread to be cut therein and the tool T is accordingly shown in the form of a tap.

Said tool is designed to be secured in the usual manner in a socket 5 on the lower end of a spindle 6 which is rotatably mounted and at the same time held against endwise movement in a reciprocable sleeve or quill 7. The latter is thus reciprocably mounted in a tubular frame member 8 that depends from a housing 9 that in turn projects forwardly from main frame 1 over work table 3.

Figure 3:
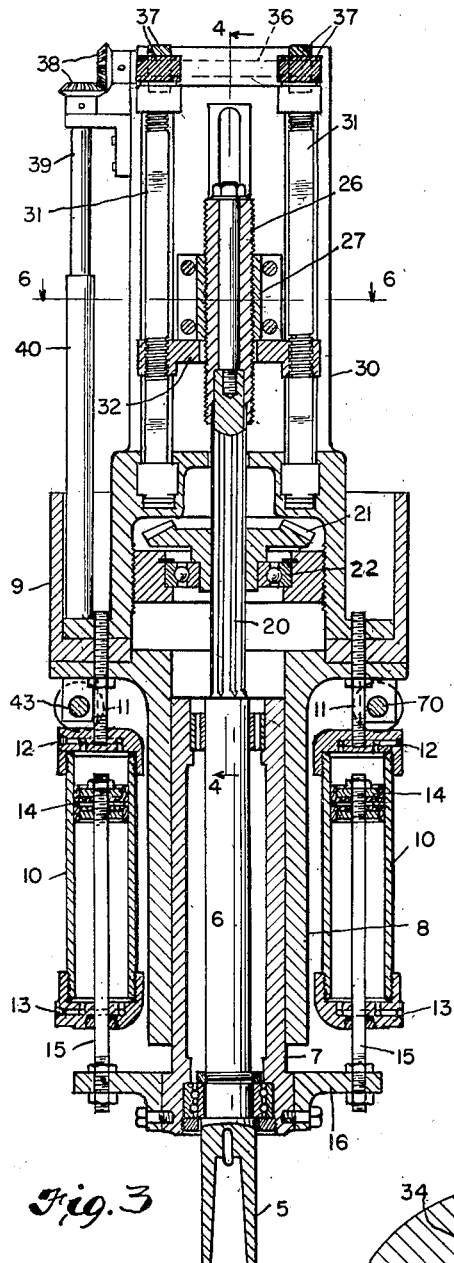
Fig. 3 is a vertical central section through the tool-carrying spindle and appurtenant parts, the plane of the section being indicated by the line 3—3 on Figs. 1 and 2.

In or on such housing are supported various operating mechanisms associated with said spindle. First, however, I shall describe the fluid pressure means for reciprocating the sleeve or quill 7 in which spindle 6 is mounted as aforesaid. As best shown in Fig. 3, two cylinders 10, 10, identical in construction, are disposed one on each side of the tubular frame extension in which said quill is reciprocably held. Each such cylinder is suitably attached at its upper end as by means of a bolt 11 to the under side of housing 9, such upper end or head being provided with a passage 12 whereby pressure fluid, either gaseous or liquid but preferably the former, may be supplied to or exhausted from the cylinder. The lower end of each cylinder is provided with a similar passage 13. A piston 14 within each cylinder is connected by means of a piston rod 15 with a corresponding side of a yoke 16 that is affixed to the lower end of sleeve or quill 7. The connections to the passages 12 and 13 and means for controlling such supply and exhaust of pressure fluid will be set forth in connection with the description of Fig. 9, which follows, it being sufficient at the present point to state that the pistons are intended to be operated in unison, so as to move said quill together with the spindle carried thereby downwardly when pressure fluid is supplied to the upper ends of the cylinders, and conversely to raise said quill and spindle when pressure fluid is supplied to the lower ends of said cylinders.

Spindle 6 extends upwardly some distance beyond quill 7, such extension 20 being splined or otherwise formed to non-rotatably but slidably engage the hub of a bevel gear 21 that is mounted in suitable bearings 22 in housing 9. Meshing with said bevel gear 21 is a bevel pinion 23 carried by the projecting end of a spindle 24 of a drive mechanism 25. The latter may comprise any suitable form of power driven reversible transmission including clutch means whereby the drive may be rendered inoperative when desired. Such transmission and clutch form no part of the present invention and so are not illustrated in detail; however an improved form thereof is disclosed and claimed in my separate application filed August 11, 1944, Serial No. 548,960, now Patent No. 2,463,265 issued March 1, 1949. The controls for such transmission and clutch, which are designed to be operated by fluid pressure, will be further illustrated in Fig. 9.

Figure 5:
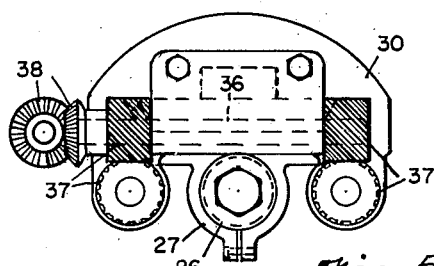
Fig. 5 is a top plan view of the mechanism shown in Figs. 1 and 3.
Figure 6:
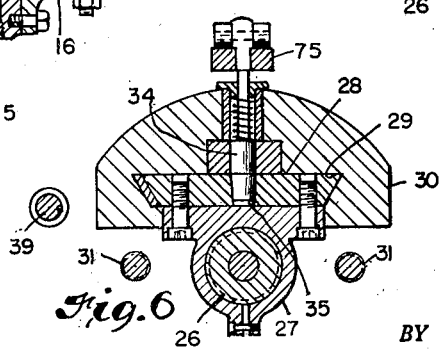
Fig. 6 is a transverse section of a portion thereof, the plane of the section being indicated by the lines 6—6, Figs. 3 and 4.

Attached to the upper end of such splined spindle extension 20, and in effect forming a part thereof, is an interchangeable lead screw 26 which engages with a nut 27, preferably split as shown in Figs. 5 and 6 so that it may be more or less closely fitted to the screw as desired. This nut, which of course will require to be changed whenever the lead screw is changed, is detachably secured to a slide 28 movably mounted in a vertical slideway 29 formed in a vertical extension 30 of frame member 9.

Accordingly it will be seen that except as said nut be held against movement in said slideway lead screw 26 will be inoperative; in other words, the spindle 6 in its entirety will be capable of free vertical reciprocation.

Located forwardly of vertical frame member 30 and in parallel relation with the slideway 29 formed therein are two similar rotatable threaded shafts 31 which lie one on one side and the other on the other of the lead screw on the upper end of the spindle. These threaded shafts engage a transverse plate 32 through which said lead screw freely passes so as to form a stop limiting downward movement of slide 28 and thus of nut 27 wherewith said lead screw engages. Plate 32 is formed with an upward extension 33 in which is mounted a latch in the form of a spring pressed plunger 34 that is adapted when the slide is thus seated on plate 32 to enter an aperture 35 therein and so lock the same in such seated position. Operation of this latch is controlled along with the operation of other parts of the mechanism, as will be presently described.

Figure 7:
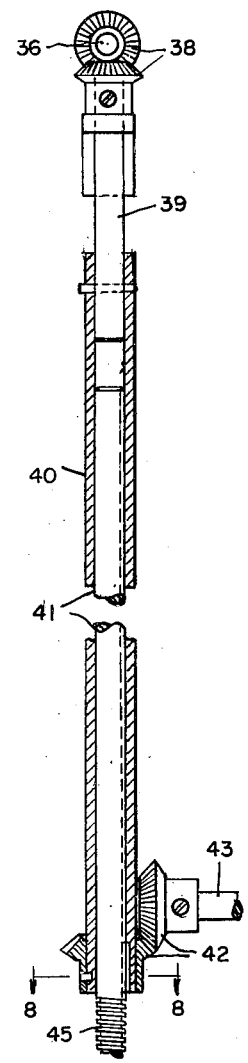
Fig. 7 is a vertical sectional view of one of the appurtenant parts, the plane of the section being taken longitudinally of member 39, Fig. 3.
Figure 8:
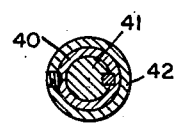
Fig. 8 is a transverse section of such part, the plane of the section being indicated by the line 8—8, Fig. 7.

The vertical position of stop plate 32 may be varied by simultaneously rotating the shafts 31 in one direction or the other. For the purpose of conveniently effecting such rotation they are connected together at their upper ends by means of a transverse shaft 36 and spiral gears 37, one end of said shaft 36 being in turn connected by bevel pinions 38 with a vertical shaft 39 rotatably mounted in suitable bearings alongside vertical frame member 30. This shaft 39, as best shown in Fig. 7, also in effect comprises a tubular extension 40 fixedly secured thereto, and an aligned shaft 41 extending into such tube 40 and being keyed or otherwise non-rotatably but slidably connected thereto. Such tube 40 extends a short distance below horizontally projecting frame member 9 and is connected by means of bevel pinions 42 with a short transverse shaft 43 that is provided with a hand wheel 44 on its outer end. Accordingly by rotating this hand wheel it will be seen that the two threaded shafts 31 which control the position of stop plate 32 may be simultaneously rotated in one direction or the other as desired.

The portion 45 of shaft 41 that extends below tube 40, or in other words below the bevel gears which connect the latter with operating shaft 43, is threaded to its lower extremity which is rotatably stepped in the yoke 16 to which piston rods 15 are attached, as previously described. Accordingly reciprocatory movement of this yoke, due to reciprocation of the pistons 14 within cylinders 10, it will be seen serves simultaneously to raise and lower shaft 41 with its threaded lower extension 45 within the tube 40.

Guided on a rod 46 disposed alongside and in parallel relation to such threaded shaft extension 45 is a latch 47 that has threaded engagement with the latter. Rotation of said shaft extension will thus serve to raise and lower this latch, the outer end of which carries a pivotal finger 48 normally held in the position shown in Fig. 1 by means of a spring 49. In this position such finger, upon the latch being moved downwardly, will snap past a spring actuated pivotal catch 50 that normally engages and holds in the position shown in Fig. 1 the actuating lever 51 of an air valve 52. However, upon reverse movement of said finger 48, as latch 47 is raised, said catch 50 will be engaged and swung so as to release said lever. The latter will thereupon be swung upwardly through the medium of a spring 53 to actuate the air valve in one direction. Actuation of such valve in the opposite direction is obtained by means of a piston 54 slidable in a cylinder 55 and pivotally connected at its lower end with said lever 51, said cylinder being connected with a source of fluid pressure through a duct 56. By way of résumé, it will be seen that when fluid under pressure is supplied through duct 56 to said cylinder, lever 51 of air valve 52 will be swung downwardly into position to be engaged by catch 50 and will be held in this position until said catch is released by upward movement of latch finger 48.

Conveniently located adjacent the air valve 52 is a limit switch 60 which is likewise adapted to be actuated coincidentally with completion of the upward movement imparted to the spindle 6 by reciprocation of pistons 14 in cylinders 10. For thus actuating said switch, the operating lever 61 thereof is provided with a roller 62 which rests on an arm 63 that projects upwardly from a lever 64. The latter is provided at its free end with an adjustable pin 65 disposed so as to be engaged by yoke 16 when the latter thus reaches its upper limit of movement. When thus engaged the lever 64 is oscillated so as in turn to oscillate the lever 61 on the switch. The latter will accordingly be termed the top limit switch in the general description of the operation of the machine which follows.

What may be conversely termed a bottom limit switch 66, such switch being preferably of quick acting type, is mounted in the frame of the machine at the rear of one of the cylinders 10, as shown in Fig. 2. For the purpose of actuating such switch at the adjustable lower limit which it is desired to impart to the reciprocatory movement of spindle 6, the following means are provided, viz. a trip-block 67 is carried by a vertically disposed threaded shaft 68 which is stepped at its lower end in yoke 16 in the same manner as is the previously described threaded shaft extension 45. Said shaft 68 is likewise of sectional construction capable of longitudinal extension, the upper end of the shaft being connected by means of bevel pinions 69 with a transverse shaft 70 rotatably mounted on the under side of frame member 9 and provided at its front end with a hand wheel 71 whereby it, and thus shaft 68, may be rotated in either direction as desired. The trip-block 67 is guided in its upward and downward movement by a rod 72 disposed alongside said shaft 68 with the result that such rotation of the latter will be effective to raise or lower said block along said shaft, while still leaving it free to move downwardly as yoke 16 moves downwardly. Accordingly, the point at which in the course of the downward movement of said yoke switch 66 is actuated by trip-block 67 may be conveniently adjusted by rotation of hand wheel 71.

Figure 4:
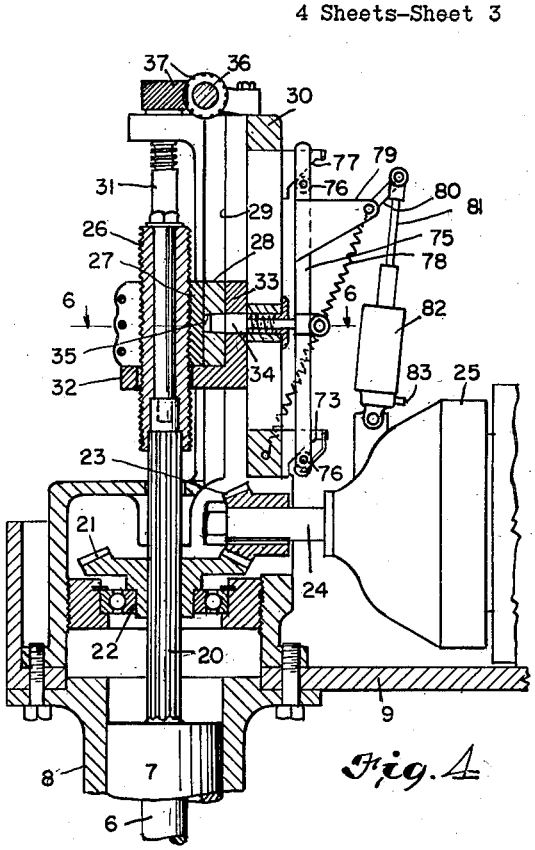
Fig. 4 is a similar section on a plane at right angles to that of Fig. 3, as indicated by line 4—4 on said figure.

Associated with the spring actuated latch 34 which, as previously described, is adapted to lock the slide 28 and lead screw nut 27 carried thereby when in seated position on stop plate 32, are means, best shown in Figs. 1 and 4, for automatically withdrawing said latch at the proper stage in the operation of the machine. It is of course necessary that the latch function both to lock and release, as required, the slide 28 which carries lead screw nut 27 irrespective of the particular point at which the latter may be brought to rest by engagement with adjustable seat 32. As previously described, the latch is carried in the upstanding portion 33 of said seat so as to be carried therealong as it is adjusted to different positions, and is normally spring actuated to engage the aperture 35 in slide 28 when the nut is in seated position. For the purpose of releasing the slide and thus the nut so as to permit the latter to be raised from such seated postion, the outer end of the latch is arranged to slidably ride on a bar 75 which is movably supported by rollers 76 adjacent its respective ends on parallel inclined guides 77, the rollers being held in contact with such guides by means of a spring 78 connected at one end to a fixed point on the machine frame and at the other to a bracket arm 79 that projects rearwardly from said bar. Connected with the latter through the medium of a short link 80 is a rod 81 that is adapted to be actuated by a cylinder and piston device 82 to which pressure fluid is supplied through a duct 83.

From the foregoing it will be seen that when pressure is thus supplied to device 82 the bar 75 will be pushed upwardly against the tension of spring 78 and at the same time caused to move outwardly by engagement of rollers 76 with the inclines 77. Accordingly, whatever the position of the latch along said bar may be, it will at the same time be pulled outwardly a sufficient distance to release slide 28 and lead screw nut 27.

Located at a convenient point on the front face of the machine frame is a pressure relief valve 85 which is connected in the fluid pressure supply system so as to relieve all pressure therefrom when desired.

Having thus described with some particularity the construction and mode of operation of the several component parts of my improved machine, its general mode of operation may be set forth, having reference to the diagrammatic showing of the machine found in Fig. 9.

It will be understood of course that the driving means employed to operate the machine will be capable of reversal so that the tool-carrying spindle may be normally driven, e. g. for performing a thread cutting operation, through the reversible transmission and clutch 25 in either direction. In other words, the reversal in direction of drive which is obtained through actuation of said transmission will be for the purpose of releasing the thread cutting tool from the work by reversing the direction of rotation of the spindle from such normal direction. It should also be explained that it is contemplated that such reversible transmission 25, just as in the case of other parts of the machine, should be operable thus to reverse the direction of the spindle drive by fluid pressure.

Accordingly, as shown in Fig. 9, fluid pressure such as compressed air is led to the machine from any suitable source through a duct D controlled by a valve 86 which may be automatically operated, in the manner now to be described. With the valve in the position shown in the drawing, pressure fluid will be led by the several branches of a duct 87 to the following mechanisms, viz.: (1) To the side of the combination transmission and clutch 25 which will cause the latter to impart forward, i. e. cutting, drive to spindle 6; (2) to cylinder 55 which will cause the latter to depress the actuating lever 51 of air valve 52 so that such lever will be engaged by catch 50; and (3) to the upper ends of the two cylinders 10 which will cause the pistons 14 therein to descend and move spindle 6 downwardly into engagement with the work-piece.

Preliminarily to the foregoing, the plate 32 will have been adjusted to the proper height so that when the spindle 6 is thus depressed to the point of engaging the tool thereon with the work-piece, lead screw nut 27 will be seated and locked in place by latch 34. Accordingly forward rotation of the spindle from this point on in performance of the cutting operation will be under control of the lead screw and such operation will continue until bottom limit switch 66 is engaged by trip-block 67, the position of which has been properly adjusted to suit the depth of the required cutting operation. Through suitable electrical connections, including a solenoid 88, the position of valve 86 is thereupon reversed so as to supply pressure fluid through the several branches of duct 89 to the following mechanisms, viz.: (1) To the reverse drive side of the combined clutch and transmission 25 whereby the direction of rotation of spindle 6 is reversed to unthread the cutting tool from the work; (2) to the piston and cylinder device 82 whereby the latter is actuated to unlock the lead screw nut from its seated position on stop-plate 32; and (3) to the lower ends of cylinders 10, whereby the pistons therein are actuated to raise spindle 6 from the work. However, it should be noted that the timing of these three operations is controlled by air valves 52 to which duct 89 leads and from which the branches thereof extend to the several devices just referred to; and that actuation of said air valve is controlled by the latch finger 48 carried by the vertically reciprocable threaded shaft 45. It will also be noted that upon completion of the upward movement imparted to the spindle 6 by admission of pressure fluid to the lower ends of cylinders 10, the top limit switch 60 is actuated by arm 63 on rock-lever 64, such switch being electrically connected with a solenoid 90 that acts upon valve 86 in the opposite direction to that of solenoid 88. As a result the latter is returned again to its initial position and the machine with its several component parts is ready to start upon another cycle of operations.

From the foregoing general description it will be seen that my improved machine presents an unusual capacity for adjustment and control while at the same time its operation is wholly automatic. Sensitivity of control is made possible by the use of precision limit switches which actuate by a movement of less than .010 in., making it possible to reverse the spindle within a quarter turn. Once the machine is set up for a particular operation, all the operator needs to do is to feed in the work and remove it after the tapping cycle. The spindle will continue to raise and lower and rotate in proper sequence. Definite depth of the thread cut is always under control, while by utilizing the lead screw only during the period of actual engagement with the work the speed of approach and retraction of the cutting tool may be greatly increased. Furthermore, the reverse rotation of the spindle while engaged with the work may be greater, e. g. twice as rapid, as the rate while in advancing engagement. Finally, the spindle need only rotate while it is actually engaged in tapping and being removed from the work.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a tapping or like machine, the combination of a frame, a quill reciprocably but non-rotatably connected to said frame, a spindle rotatable in said quill and connected thereto for reciprocation therewith, a lead screw fixed on said spindle, a nut reciprocably but non-rotatably carried by said frame and having threaded engagement with said screw, means associated with said quill operative to reciprocate the latter, other means associated with said spindle operative to selectively rotate the latter in opposite directions, a stop on said frame engaged by said nut upon predetermined movement of said nut in one direction in response to movement of said quill and spindle in one direction by said means and rotation of said spindle in one direction by said other means, a latch on said frame engaging said nut following such predetermined movement of said nut for locking the same whereby continued movement of said quill and spindle during continued rotation of the latter in such one direction is under the control of said lead screw and nut, control means on said frame engaged by said quill upon predetermined continued movement of said quill and spindle and so coupled with said means associated with said quill and with said other means associated with said spindle as to render said means inoperative and said other means operative to rotate said spindle in an opposite direction, other control means on said frame responsive to opposite movement of said quill and spindle effected by rotation of said spindle and thus said lead screw in an opposite direction as aforesaid to disengage said latch from said nut and to initiate operation of said means associated with said quill in an opposite direction for continuing such opposite movement of said quill and spindle and thus said nut away from said stop means.

2. The structure according to claim 1 further characterized in that a third control means is provided on said frame engaged by said quill upon predetermined movement of the latter in such opposite direction operative to reverse the direction of operation of said means associated with said quill and said other means associated with said spindle.

3. The structure according to claim 1 further characterized in that said means associated with said quill comprises a fluid pressure cylinder and piston respectively connected to said frame and quill, and that said control means comprises a reversing valve provided with a pressure inlet port, an exhaust port, and a pair of ports communicating with said cylinder on opposite sides of said piston, said reversing valve having means associated therewith rendering the piston and cylinder inoperative by connecting said cylinder on one side of said piston to such exhaust port and blocking communication between such pressure inlet port and the cylinder on the other side of said piston.

4. The structure according to claim 3 further characterized in that said other control means comprises another fluid pressure operated cylinder and piston with the piston connected to said latch, and a valve operated by said quill to connect such pressure inlet port of said reversing valve to said another cylinder and to said first-named cylinder on such opposite side of the piston therein.

5. In a tapping or like machine, the combination of a frame, a quill reciprocably but non-rotatably connected to said frame, a spindle rotatable in said quill and connected thereto for reciprocation therewith, a lead screw fixed on said spindle, a nut reciprocably but non-rotatably carried by said frame and having threaded engagement with said screw, means associated with said quill operative to reciprocate the latter, other means associated with said spindle operative to selectively rotate the latter in opposite directions, a stop on said frame engaged by said nut upon predetermined movement of said nut in one direction in response to movement of said quill and spindle in one direction by said means and rotation of said spindle in one direction by said other means, and a latch on said frame engaging said nut following such predetermined movement of said nut for locking the same whereby continued movement of said quill and spindle during continued rotation of the latter in such one direction is under the control of said lead screw and nut.

6. In a tapping or like machine, the combination of a frame, a quill reciprocably but non-rotatably connected to said frame, a spindle rotatable in said quill and connected thereto for reciprocation therewith, a lead screw fixed on said spindle, a nut reciprocably but non-rotatably carried by said frame and having threaded engagement with said screw, means associated with said quill operative to reciprocate the latter, other means associated with said spindle operative to selectively rotate the latter in opposite directions, a stop on said frame engaged by said nut upon predetermined movement of said nut in one direction in response to movement of said quill and spindle in one direction by said means and rotation of said spindle in one direction by said other means, a latch on said frame engaging said nut following such predetermined movement of said nut for locking the same whereby continued movement of said quill and spindle during continued rotation of the latter in such one direction is under the control of said lead screw and nut, and control means on said frame engaged by said quill upon predetermined continued movement of said quill and spindle and so coupled with said means associated with said quill and with said other means associated with said spindle as to render said means inoperative and said other means operative to rotate said spindle in an opposite direction.

MARK GRAVES.

REFERENCES CITED

The following references are of record in the file of this patent:

UNITED STATES PATENTS

| Number | Name | Date |
|---|---|---|
| 512,542 | Forbes | Jan. 9, 1894 |
| 1,747,111 | Galloway | Feb. 11, 1930 |
| 1,809,188 | Barnes | June 9, 1931 |
| 1,994,079 | Svenson | Mar. 12, 1935 |
| 2,054,018 | Gilchrist | Sept. 8, 1936 |
| 2,206,031 | Drissner et al. | July 2, 1940 |
| 2,254,032 | Fisher | Aug. 26, 1941 |
| 2,257,364 | Bakewell | Sept. 30, 1941 |
| 2,268,078 | McCurdy | Dec. 30, 1941 |
| 2,327,279 | Masfield | Aug. 17, 1943 |
| 2,368,499 | Stone | Jan. 30, 1945 |
| 2,368,359 | Hellstrom | Jan. 30, 1945 |
| 2,376,164 | Miller et al. | May 15, 1945 |

FOREIGN PATENTS

| Number | Country | Date |
|---|---|---|
| 548,432 | Great Britain | Oct. 9, 1942 |